June 6, 1967   C. J. OXFORD, SR   3,323,260
METHOD OF ELIMINATING VARIATIONS IN THREAD THICKNESS IN TAPS
Original Filed Aug. 13, 1962
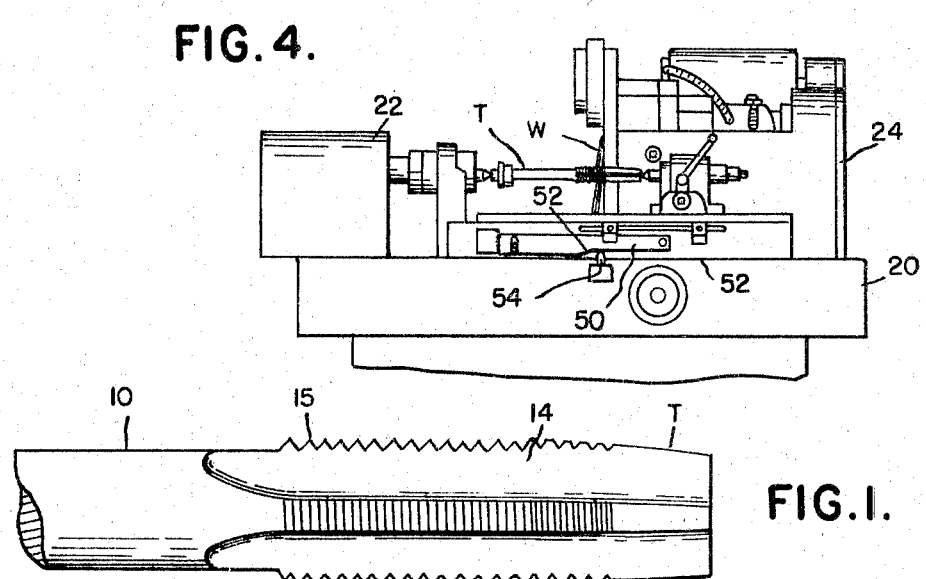
FIG. 4.
FIG. 1.
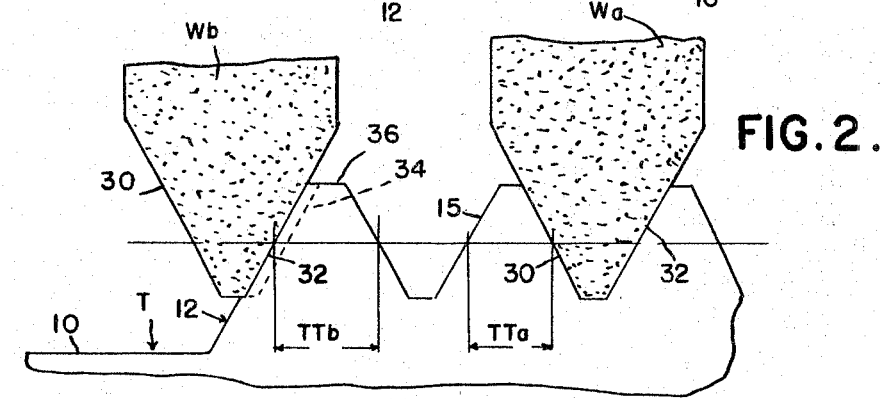
FIG. 2.
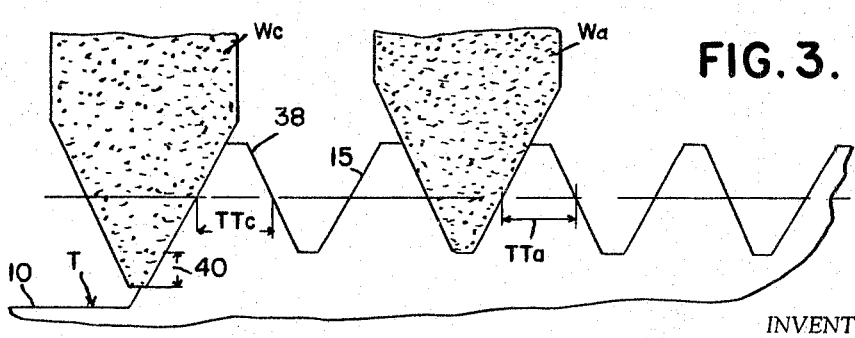
FIG. 3.
INVENTOR.
CARL J. OXFORD SR.
BY Whittemore
Hulbert & Belknap
ATTORNEYS 3,323,260
METHOD OF ELIMINATING VARIATIONS IN THREAD THICKNESS IN TAPS
Carl J. Oxford, Sr., Rochester, Mich., assignor to National Twist Drill & Tool Company, Rochester, Mich., a corporation of Michigan
Original application Aug. 13, 1962, Ser. No. 216,433. Divided and this application June 26, 1964, Ser. No. 380,980
5 Claims. (Cl. 51—288)

This application is a division of my application Ser. No. 216,433, filed Aug. 13, 1962, now abandoned.

The present invention relates to the method of eliminating variations in thread thickness in taps.

A nib tap is a tool for tapping a thread in nuts and comprises a threaded and fluted head supported by a shank whose diameter is less than the root diameter of the threads on the head. With this arrangement a nut may be threaded by the tap and advanced axially over the head onto the shank. A plurality of such nuts threaded by the tap results in feeding the tapped nuts along the shank. The shank is bent laterally and supported through the medium of the nuts on the shank in a rotary drive tool. In this case the nuts are advanced longitudinally of the shank and are eventually thrown off the laterally bent end thereof.

In nut taps the shank may be straight and a predetermined number of tap nuts may be accumulated on the shank before removing the shank from drive means for removal of the nuts.

In the manufacture of taps of the type referred to it has been found that when the thread on the previously fluted head is ground from the end of the head remote from the shank through the end of the head adjacent the shank the last complete thread or the last portions of the thread axially exposed from the shank end (in the event of multithread taps) shows appreciably greater thread thickness. This increased thread thickness on the last thread of the tap tended to produce a slightly wider thread space. This small increase in width of the thread space is not itself harmful, but the fact that the last thread portion on the tap is of increased width produced a bent over or fin portion on the last thread of the nut as it comes off the threaded head of the tap. This results in nuts which cannot pass a thread gauge check.

The explanation for the presence of the final thread convolution or portion thereof which is thicker than the thread portions intermediate the ends of the tap is that the grinding wheel as it grinds the last portion of the thread convolution adjacent the shank of the tap is unsupported at the side of the wheel adjacent the shank. As the wheel forms the intermediate thread portions it is of course engaged in grinding both sides of adjacent thread convolutions and hence, is supported against lateral displacement. When however, the relative feed advances the wheel to the point where it is grinding the axially exposed surface only of the last thread convolution or portion thereof, the forces developed between the grinding wheel and the tap are such as to produce some lateral displacement of the wheel. While this displacement is not large, it is appreciable and unavoidable and leads to the rejection of nuts as previously described.

It is an object of the present invention to provide a method of producing taps having continuous threads extending from end to end of the relatively enlarged head, characterized in that the final thread portion, adjacent the shank, has a thread thickness, measured axially of the tap, which is at most no greater than the uniform thread thickness of the thread portions intermediate the ends of the tap.

It is a further object of the present invention to produce taps as described in the preceding paragraph in which the final thread portion at the shank end of the head is formed so that its root is at a lesser distance from the axis of the tap than the root portions of the thread intermediate the ends of the tap.

It is a further object of the present invention to provide a method of making a tap as described in the preceding paragraphs in which the pitch line thread thickness, measured axially of the tap, is substantially uniform from end to end, including particularly the final portion of the thread at the shank end thereof.

It is a further object of the present invention to provide a novel method of producing taps having a shank provided at one end with an enlarged head, and in which the head is provided throughout its entire axial extent with a continuous thread, which comprises grinding the thread form into the fluted head with a uniform spacing of the grinding wheel radially of the head during formation of the entire thread therein with the exception of the final portion adjacent the shank end thereof, and reducing the radial spacing of the grinding wheel with respect to the head during the grinding of the final thread portion.

It is a further object of the present invention to provide a method as described in the preceding paragraph which comprises maintaining a constant uniform spacing between the grinding wheel and head so long as the grinding wheel is engaged at both lateral surfaces thereof by the material of the head, and reducing the radial spacing of the wheel relative to the head as the grinding wheel moves out of the head so as to engage only the side surface of the final thread convolution exposed at the shank end thereof.

It is a further object of the present invention to provide a method for making taps as described in the preceding paragraphs in which the reduction of radial spacing between the grinding wheel and tap during grinding of the final thread convolution at the shank end thereof is controlled to maintain a substantially constant thread pitch line thickness throughout the entire thread including its final convolution at the shank end thereof.

Other objects and features of the invention will become apparent as the description proceeds, especially when taken in conjunction with the accompanying drawings, illustrating a preferred embodiment of the invention, wherein:

FIGURE 1 is a fragmentary side elevation of the threaded portion of the nib tap.

FIGURE 2 is a diagrammatic view illustrating lateral displacement of the grinding wheel during grinding of the final thread convolution.

FIGURE 3 is a view similar to FIGURE 2, illustrating the correction for lateral displacement of the wheel in accordance with the present invention.

FIGURE 4 is a simplified elevational view of the thread grinder which may be used to practice the present invention.

Referring now to FIGURE 1, there is illustrated a tap T having a reduced shank 10 and a slightly enlarged head portion 12 provided with flutes 14 and thread portions 15 which are interrupted by the flutes 14. It will of course be understood that the thread portions 15 are in helical alignment and that where interrupted by the flanges, cutting edges are provided which are adapted to cut the threads in a nut. The leading end of the tap as indicated at 16, is reduced to facilitate entry of the tap into the central opening of a nut body to provide for a graduated cut during formation of the threads.

The tap is operated in such a way that the nut as it is tapped is advanced axially along the head 12 of the tap until its threads have been cut to full depth, and eventually it passes off the threaded fluted head 12 onto the shank 10. For this reason the shank 10 has a diameter which is less than the root diameter of the threaded portion of the head. This of course is because the root surfaces of the threaded portion of the tap determine the diameter of the crest portions of the teeth in the nut and the internal diameter of the threaded nut, as determined by the crests of its teeth, will permit the nut to move axially of the cylindrical shank 10 of the tap.

It is of course desirable to provide a single continuous thread or plurality of threads for the entire length of the head of the tap.

The thread is formed on the head of the tap by a grinding operation. In this grinding operation the enlarged head, which is previously fluted and hardened, has the thread formation ground therein by a grinding wheel set at the appropriate angle to engage the helically formed thread. The wheel is of course driven at proper grinding speed and a relative feeding movement is provided between the wheel and tap. Conveniently, this relative feeding movement is accomplished by feeding the tap axially and by rotating it in accordance with the lead or helix angle of its thread while the grinding wheel is maintained stationary.

Referring now to FIGURE 4 there is illustrated a thread grinder 20 including means 22 for supporting the tap T for combined axial advance and rotation in accordance with the required lead or helix angle of the thread. Associated with the tap T is a grinding wheel W which is driven in rotation and which is angularly adjusted as indicated in an exaggerated manner in the figure to conform to the helix angle or lead of the tap. The wheel W is carried by a support 24 which permits movement of the wheel radially of the tap T.

Referring now to FIGURE 2 there is shown a portion of the tap T, the shank 10 being shown as of smaller diameter than the head portion 12. The tap is shown with its thread 15 engaged by the grinding wheel W in two positions, here designated W$a$ and W$b$. In the position W$a$ it will be observed that the grinding wheel is engaged uniformly on both side surfaces 30 and 32 thereof, and hence, there is no tendency for displacing the grinding wheel laterally. However, as a result of continued axial advance and rotation of the tap T it eventually reaches the position relative to the wheel indicated by the wheel location designated W$b$. At this time it will be observed that the inclined peripheral portion of the wheel is engaged only at its side surface 32 and the surface 30 is not engaged. Even though the wheel is supported as firmly as possible, there is nevertheless an unavoidable slight but determinable lateral displacement of the wheel. This displacement is diagrammatically indicated by showing at 34 the proper location for the axially exposed surface of the final convolution or portion 36 of the thread which would result in a tooth portion having the same axial thickness as the tooth convolutions to the right thereof as seen in FIGURE 2. In this figure it will be observed that due to the lateral displacement of the wheel to the position illustrated at W$b$, the thread thickness designated by the dimension TT$b$ is greater than the thread thickness TT$a$ of the threads formed while the grinding wheel is engaged substantially uniformly on both lateral sides thereof.

In the case of a single continuous thread the thickening of the thread referred to above exists for somewhat less than the final 360 degrees' convolution thereof, as for example, between 270 degrees and 180 degrees. If the tap is provided with two threads it will of course be apparent that one thread serves to afford some support for the wheel during grinding of the final portion of the convolution of the other thread. In any case however, the thread thickening is the result of lack of support of the grinding wheel during grinding of the side surface of the thread which is exposed axially toward the shank end of the tap.

Referring now to FIGURE 3 there is illustrated a tap in which the thickening of the final portion of the thread intermediate the shank end thereof is eliminated and in which the elimination of the thread thickening is carried out without the necessity of a separate operation during the initial thread grinding operation. In this figure the grinding wheel is diagrammatically indicated in the position W$a$ which corresponds exactly to the wheel position shown at W$a$ in FIGURE 2. However, in FIGURE 3 the wheel position indicated at W$c$ represents a displacement of the wheel toward the axis of the tap T during the grinding of the final portion of the thread 15 at the shank end of the tap. It will be observed that in the diagrammatic illustration the grinding wheel is illustrated as having been shifted radially inwardly of the tap by a dimension 40 and that with this displacement of the wheel the final portion or convolution 38 of the thread 15 has the same pitch line thickness here designated TT$c$, as the pitch line thread thickness throughout the remainder of the tap as illustrated at TT$a$.

While FIGURE 3 illustrates the radial infeed of the wheel during the grinding of the final thread convolution as being of the amount required to maintain uniform thread thickness, the invention does not require the final thread convolution to be of exactly the same thickness as of the preceding thread convolutions. The basic requirement is only that the pitch line thickness of the thread in the final convolution shall be no greater than the thread thickness of the preceding convolutions. It has previously been pointed out that increased tooth thickness at this point results in the formation of a bent over portion or fin on the final thread of the nut as it comes off the threaded and fluted head of the tap. In practice the tooth thickness of the final convolution of the thread on the tap is made somewhat less than the thread thickness throughout the remainder of the tap to avoid the possibility of the fin-forming interference referred to.

Referring again to FIGURE 4, the production of the taps as previously described is accomplished by controlling the position of the wheel support so that during the grinding of the final portion of the thread on the tap at the shank end thereof, the wheel support moves forwardly so as to feed the wheel radially inwardly with respect to the tap. This may be most conveniently and simply accomplished by a guide bar 50 controlling the position of the wheel support which includes an inclined surface 52 engaged by a follower 54 so that the wheel moves inwardly during the grinding operation on the final portion of the thread at a rate sufficient to insure that the pitch line thickness of this final thread portion is at least no greater than the corresponding thickness of thread portions in the remainder of the thread. The thread grinder more or less diagrammatically shown in FIGURE 4 is an Ex-Cell-O grinder.

While the practice of the method resulting from the above described operation of the machine shown in FIGURE 4 is believed obvious, a further slight amplification of the description will now be made. It will be understood that as in convetnional tap manufacture, the tap body T is fluted and hardened and the end of the head of the tap remote from the shank 10 is tapered generally conically at a small angle as illustrated in FIGURE 1. The peripheral portion of the grinding wheel W is trimmed so that it conforms to a single thread space on the tap and is thus adapted to engage and grind confronting sides of adjacent tap convolutions. The grinding wheel is inclined at the helix angle of the threads, a condition which is illustrated in an exaggerated manner in FIGURE 4. The wheel is maintained at a constant radial distance from the axis of the tap as the tap is advanced axially and is rotated in conformance with its axial advance. This radial spacing of the wheel is such that it initially engages the tapered end portion of the tap at a point spaced somewhat inwardly from the end of the tap, this condition being illustrated in FIGURE 1. Accordingly, the wheel initiates its formation of a thread space and as the tap is advanced and rotated the wheel is maintained at a constant spacing. Due to the tapered formation of the tap this results in grinding the thread to full form, although the root of the thread is of course maintained at a constant radial distance from its axis. This condition continues until the advance of the tap causes the portion of the wheel engaged in the thread groove which it is forming to reach the inner end of the head, at which time the grinding wheel loses lateral support from the direction of the shank. At this time the wheel is fed radially inwardly as previously described.

The drawing and the foregoing specification constitute a description of the method of grinding a thread formation in a tap in such full, clear, concise and exact terms as to enable any person skilled in the art to practice the invention, the scope of which is indicated by the appended claims.

What I claim as my invention is:

1. The method of grinding a thread formation of constant pitch line thread thickness on a tap having a head and a shank of reduced diameter for substantially the full axial extent of the head which comprises supporting the tap and a grinding wheel having its periphery trimmed to enter and conform to a single thread space at a constant radial spacing with respect to the tap while grinding all but the thread portions exposed axially from the shank end of the tap, and grinding the thread portions exposed axially from the shank end of the head at a sufficiently reduced radial spacing with respect to the tap to prevent an increase in pitch line thread thickness due to lack of axial support of the wheel at both sides thereof while grinding the last named thread portions.

2. The method of grinding a thread formation of constant pitch line thread thickness on a tap having a head and a shank of reduced diameter for substantially the full axial extent of the head which comprises supporting a tap body having a reduced shank and axially elongated fluted head for rotation, supporting a grinding wheel having its edge shaped to conform to a single thread space on the tap in position to engage in a thread space, driving the wheel at grinding speed, effecting a slow relative feed between the tap body and wheel parallel to the axis of the tap body, rotating the tap body about its axis in accordance with the relative axial feed to form a helical thread space in the head, maintaining the spacing of the wheel radially of the body fixed while the periphery of the wheel remains engaged at both sides of the thread space, and reducing such radial spacing as the wheel becomes engaged on one side only in forming the thread portion exposed axially at the shank end of the tap body.

3. The method of grinding a thread formation of constant pitch line thread thickness on a tap having a head and a shank of reduced diameter for substantially the full axial extent of the head which comprises supporting a tap body having a reduced shank and axially elongated fluted head for rotation, supporting a grinding wheel having its edge shaped to conform to a single thread space on the tap in position to engage in a thread space, driving the wheel at grinding speed, effecting a slow relative feed between the tap body and wheel parallel to the axis of the tap body, rotating the tap body about its axis in accordance with the relative axial feed to form a helical thread space in the head, maintaining the spacing of the wheel radially of the body fixed while the periphery of the wheel remains engaged at both sides of the thread space, and reducing such radial spacing as the wheel becomes engaged on one side only in forming the thread portion exposed axially at the shank end of the tap body, the rate of reduction in radial spacing being sufficient to prevent an increase in pitch line thread thickness in thread portions at the shank end of the head.

4. The method of grinding a thread formation of constant pitch line thread thickness on a tap having a head and a shank of reduced diameter for substantially the full axial extent of the head which comprises supporting a tap body having a reduced shank and axially elongated fluted head for rotation, supporting a grinding wheel having its edge shaped to conform to a single thread space on the tap in position to engage in a thread space, driving the wheel at grinding speed, effecting a slow relative feed between the tap body and wheel parallel to the axis of the tap body, rotating the tap body about its axis in accordance with the relative axial feed to form a helical thread space in the head, maintaining the spacing of the wheel radially of the body fixed while the periphery of the wheel remains engaged at both sides of the thread space, and reducing such radial spacing as the wheel becomes engaged on one side only in forming the thread portion exposed axially at the shank end of the tap body, the rate of reduction in radial spacing being sufficient to maintain a substantially constant pitch line thread thickness in thread portions at the shank end of the head.

5. The method of grinding a thread formation on a tap having a shank and a fluted head of greater diameter than said shank and having a generally conically tapered end remote from said shank which comprises supporting a grinding wheel having its periphery trimmed to conform to a single thread space of the thread desired on said tap, positioning the wheel at the required angle with respect to the thread on the tap and beyond the tapered end of said head remote from said shank at a radial spacing from the axis of the tap to form the required threads thereon, driving the wheel at grinding speed, effecting relative axial movement between said tap and wheel, rotating the tap in timed relation to such relative axial movement, maintaining the radial spacing between the wheel and tap at a constant dimension so long as the wheel has its peripheral portion engaged on both sides by portions of thread convolutions on the head of said tap, and grinding the thread convolutions at the end of said head adjacent said shank at a reduced radial spacing between the wheel and tap to compensate for lateral displacement of the wheel while its peripheral portion is engaged at only one side of the wheel by a tap thread portion.

References Cited
UNITED STATES PATENTS

| | | | |
|---|---|---|---|
| 2,330,099 | 9/1943 | Whyland | 10—141 |
| 3,023,546 | 3/1962 | Beck | 51—288 X |

LESTER M. SWINGLE, *Primary Examiner.*